US010689959B2

(12) United States Patent
Simpson

(10) Patent No.: US 10,689,959 B2
(45) Date of Patent: Jun. 23, 2020

(54) FLUID INJECTION SYSTEM

(71) Applicant: Cameron International Corporation, Houston, TX (US)

(72) Inventor: David Simpson, County Longford (IE)

(73) Assignee: Cameron International Corporation, Houston, TX (US)

( * ) Notice: Subject to any disclaimer, the term of this patent is extended or adjusted under 35 U.S.C. 154(b) by 187 days.

(21) Appl. No.: 15/374,051

(22) Filed: Dec. 9, 2016

(65) Prior Publication Data
US 2018/0163522 A1 Jun. 14, 2018

(51) Int. Cl.
| *E21B 43/12* | (2006.01) |
| *E21B 33/068* | (2006.01) |
| *E21B 47/06* | (2012.01) |
| *E21B 49/08* | (2006.01) |
| *E21B 34/04* | (2006.01) |
| *G05D 7/06* | (2006.01) |
| *G05B 15/02* | (2006.01) |
| *E21B 43/16* | (2006.01) |

(52) U.S. Cl.
CPC .......... *E21B 43/123* (2013.01); *E21B 33/068* (2013.01); *E21B 34/04* (2013.01); *E21B 43/122* (2013.01); *E21B 43/166* (2013.01); *E21B 47/06* (2013.01); *E21B 47/065* (2013.01); *E21B 49/08* (2013.01); *G05B 15/02* (2013.01); *G05D 7/0629* (2013.01)

(58) Field of Classification Search
CPC .... E21B 43/123; E21B 43/122; E21B 43/166; E21B 43/121; E21B 49/08; E21B 47/065; E21B 47/06; E21B 47/122; E21B 33/068; E21B 34/04; E21B 34/16; E21B 34/08; E21B 34/066; E21B 17/003; E21B 2041/0028; G05B 15/02; G05D 7/0629
See application file for complete search history.

(56) References Cited

U.S. PATENT DOCUMENTS

| 5,014,789 | A | 5/1991 | Clarke et al. |
| 6,595,294 | B1 | 7/2003 | Dalsmo et al. |
| 8,763,693 | B2 | 7/2014 | McHugh et al. |
| 9,062,527 | B2 | 6/2015 | McHugh et al. |
| 9,365,271 | B2 | 6/2016 | Minnock et al. |
| 9,840,885 | B2 | 12/2017 | McHugh et al. |

(Continued)

FOREIGN PATENT DOCUMENTS

| WO | 8800277 A1 | 1/1988 |
| WO | 0000715 A1 | 1/2000 |
| WO | 20100065210 A1 | 6/2010 |

OTHER PUBLICATIONS

PCT International Search Report & Written Opinion; Application No. PCT/US2017/065466; dated Feb. 27, 2018; 13 pages.

*Primary Examiner* — George S Gray
(74) *Attorney, Agent, or Firm* — Fletcher Yoder, P.C.

(57) ABSTRACT

A fluid injection system is configured to inject a fluid into a well. A sensor is separate from the fluid injection system. A first controller is configured to adjust at least one parameter of the fluid injection system in response to feedback from the sensor. The fluid injection system includes a housing having an electrical connector, a fluid inlet, a fluid outlet, and a fluid path between the fluid inlet and the fluid outlet, a valve disposed along the fluid path, and a flow meter disposed along the fluid path.

25 Claims, 13 Drawing Sheets

(56) References Cited

U.S. PATENT DOCUMENTS

| | | | |
|---|---|---|---|
| 2002/0029883 A1* | 3/2002 | Vinegar | E21B 17/003 166/250.15 |
| 2005/0166961 A1* | 8/2005 | Means | E21B 37/06 137/13 |
| 2007/0107907 A1* | 5/2007 | Smedstad | E21B 33/0355 166/357 |
| 2008/0121397 A1* | 5/2008 | Galloway | E21B 43/123 166/305.1 |
| 2011/0297392 A1* | 12/2011 | McHugh | E21B 33/076 166/373 |
| 2013/0319103 A1* | 12/2013 | Mulford | E21B 47/06 73/152.29 |
| 2014/0299210 A1* | 10/2014 | Atherton | G01F 1/74 137/624.27 |
| 2015/0068440 A1* | 3/2015 | Minnock | B63G 8/001 114/312 |
| 2016/0115395 A1* | 4/2016 | Rustad | C10G 33/08 700/282 |
| 2018/0135387 A1* | 5/2018 | Older | E21B 43/36 |

* cited by examiner

FLUID INJECTION SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wells are often used to access resources below the surface of the earth. For instance, oil, natural gas, and water are often extracted via a well. In certain applications, one or more fluids (e.g., liquid and/or gaseous fluids) may be injected into the well for storage and/or enhanced oil recovery. For example, carbon dioxide, natural gas, or other fluids may be injected into the well for storage. Furthermore, one or more fluids (e.g., chemicals) may be injected into the well to enhance well output. Unfortunately, existing fluid injection systems may have components distributed in various fixed locations around the well, such that each component involves separate installation and may not be readily accessible or removable for servicing. In addition, existing fluid injection systems may inject too little or too much fluid, thereby reducing its effectiveness and/or increasing costs.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed toward a fluid (e.g., lift gas) injection system, such as a gas lift metering valve (GLMV) system, which includes a flow meter system (e.g., one or more flow meters), one or more adjustable valves, one or more non-return valves (e.g., check valves or one-way valves), and a controller (e.g., electronic controller) in a single module (e.g., retrievable module). In certain embodiments, the single module is electric (e.g., one or more components are driven or powered by electricity rather than hydraulics) and capable of insertion and removal from a sub-sea mineral extraction system with a remotely operated vehicle (ROV), which facilitates and reduces costs for repairing, inspecting, or replacing fluid injection systems. In operation, the fluid injection system enables measurement and control of fluids used in mineral extraction operations. For example, the fluid injection system may measure and control fluids used to increase resource extraction or to increase the operating life of a well. The GLMV may be controlled based on feedback from a measurement device (e.g., MPFM) that measures characteristics of the well's output flow. In some embodiments, the GLMV may also be configured to predict when there is a risk of hydrate plug formation and take action to mitigate that risk.

Figure 1:
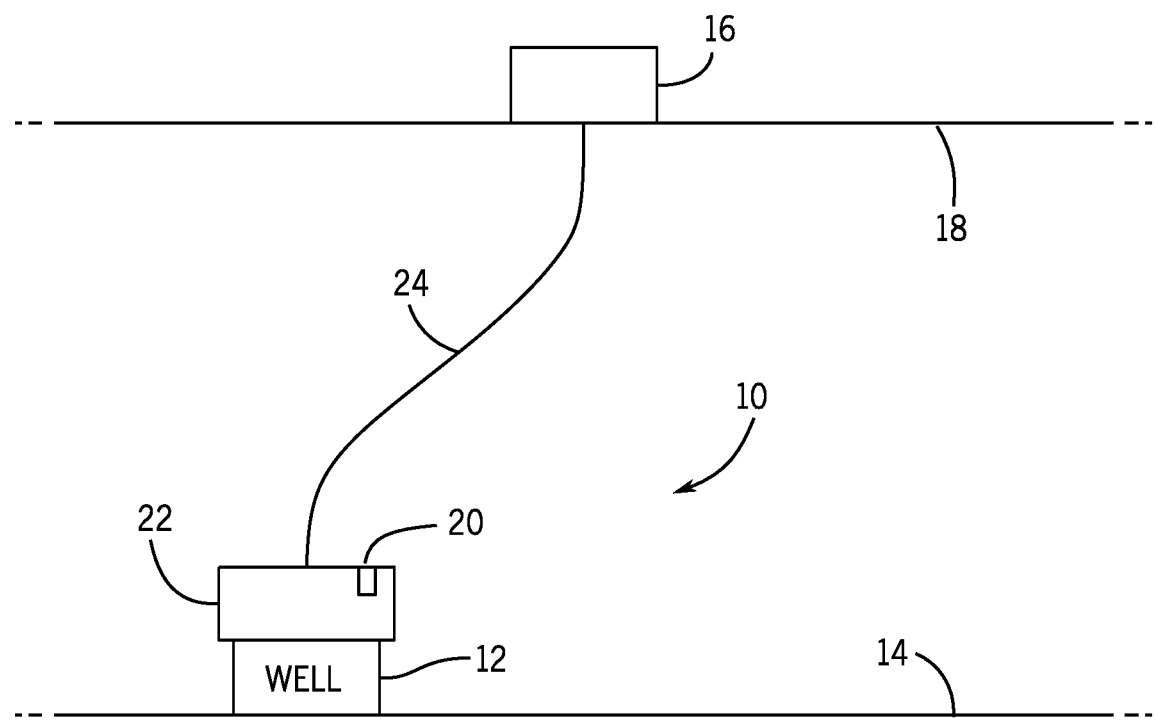
FIG. 1 is a block diagram of an embodiment of a sub-sea resource extraction system.

FIG. 1 depicts an exemplary sub-sea resource extraction system 10. In particular, the sub-sea resource extraction system 10 may be used to extract oil, natural gas, and other related resources from a well 12, located on a sub-sea floor 14, to an extraction point 16 at a surface location 18. The extraction point 16 may be an on-shore processing facility, an offshore rig, or any other extraction point. The sub-sea resource extraction system 10 may also be used to inject fluids, such as water, gas, chemicals, and so forth, into the well 12 through an underwater fluid injection system 20 (e.g., a chemical-injection system, such as a chemical injection metering valve [CIMV] or GLMV system) on a Christmas tree 22. In some embodiments, lift gas may be injected at the bottom of a hydrocarbon column to reduce the density of the column and improve recovery of hydrocarbons. The lift gas may be an export gas that has been captured or siphoned off, cleaned, and otherwise treated for injection. For example, the lift gas may include water vapor (e.g., steam), air, carbon dioxide, or any other suitable gas. In some embodiments, the removable fluid injection system 20 may accurately inject corrosion-inhibiting materials, foam-inhibiting materials, wax-inhibiting materials, and/or anti-freeze to extend the life of a well or increase the resource extraction rate from the well 12. These fluids may be injected into the well 12 in a controlled manner over a period of time by the fluid injection system 20. The working fluids may be supplied to the sub-sea equipment using flexible jumper or umbilical lines 24. The flexible jumper or umbilical lines 24 may include reinforced polymer and small diameter steel supply lines, which are interstitially spaced into a larger reinforced polymer liner.

Figure 2:
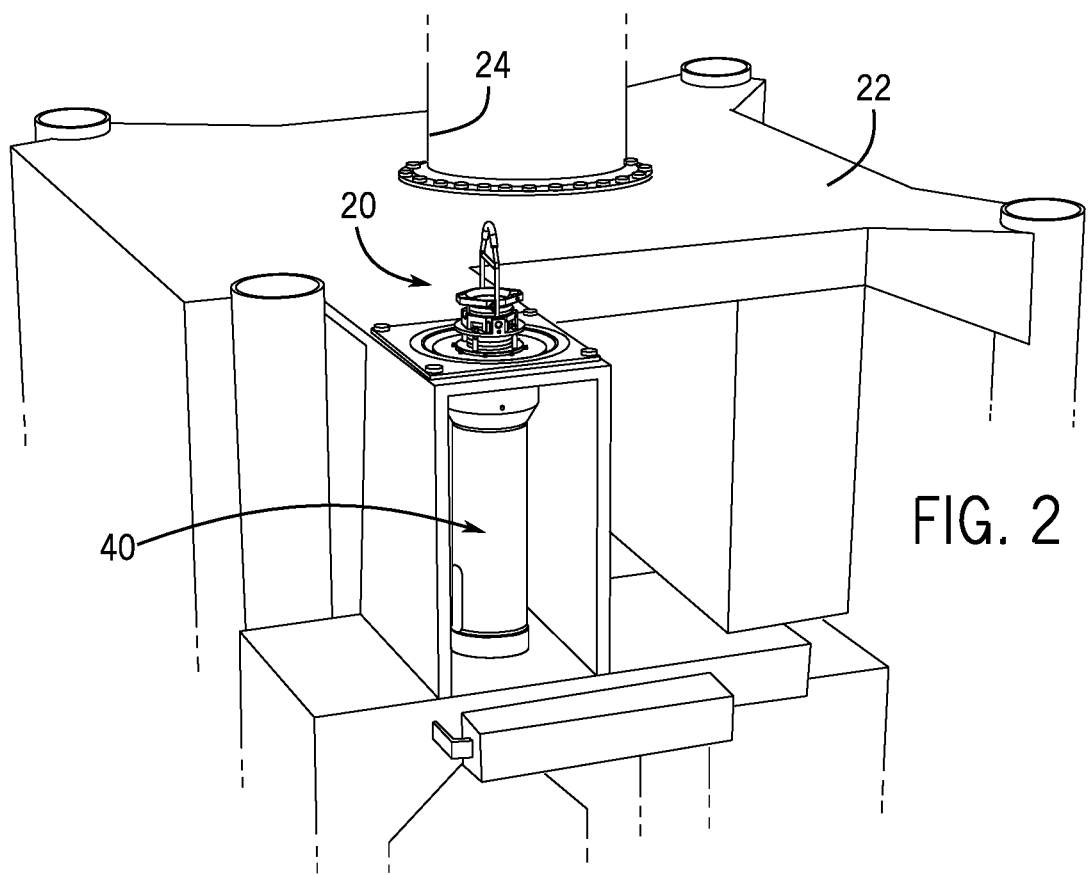
FIG. 2 is a partial perspective view of an embodiment of a Christmas tree with a fluid injection system.

FIG. 2 is a partial perspective view of an embodiment of the Christmas tree 22 with the fluid injection system 20. The tree 22 couples to the well 12 and may include a variety of valves, fittings, and controls for extracting resources from the well 12. As illustrated, the Christmas tree 22 includes the receptacle 40 that removably receives (e.g., removably locks) the fluid injection system 20. The receptacle 40 enables fluid and electrical communication between the Christmas tree 22 and the fluid injection system 20. As will be discussed in detail below, when attached, the fluid injection system 20 measures and controls fluid flow into the well 12. For example, the fluid injection system 20 may inject water, gas, corrosion-inhibiting materials, foam-inhibiting materials, wax-inhibiting materials, and/or antifreeze to increase a mineral extraction rate out of the well or extend the life of the well. By further example, the fluid injection system 20 may inject lift gas to reduce the density of the hydrocarbons, thereby increasing flow of the hydrocarbons out of the well 12. Again, these materials may be injected into the well in a controlled manner over a period of time by the fluid injection system 20.

Figure 3:
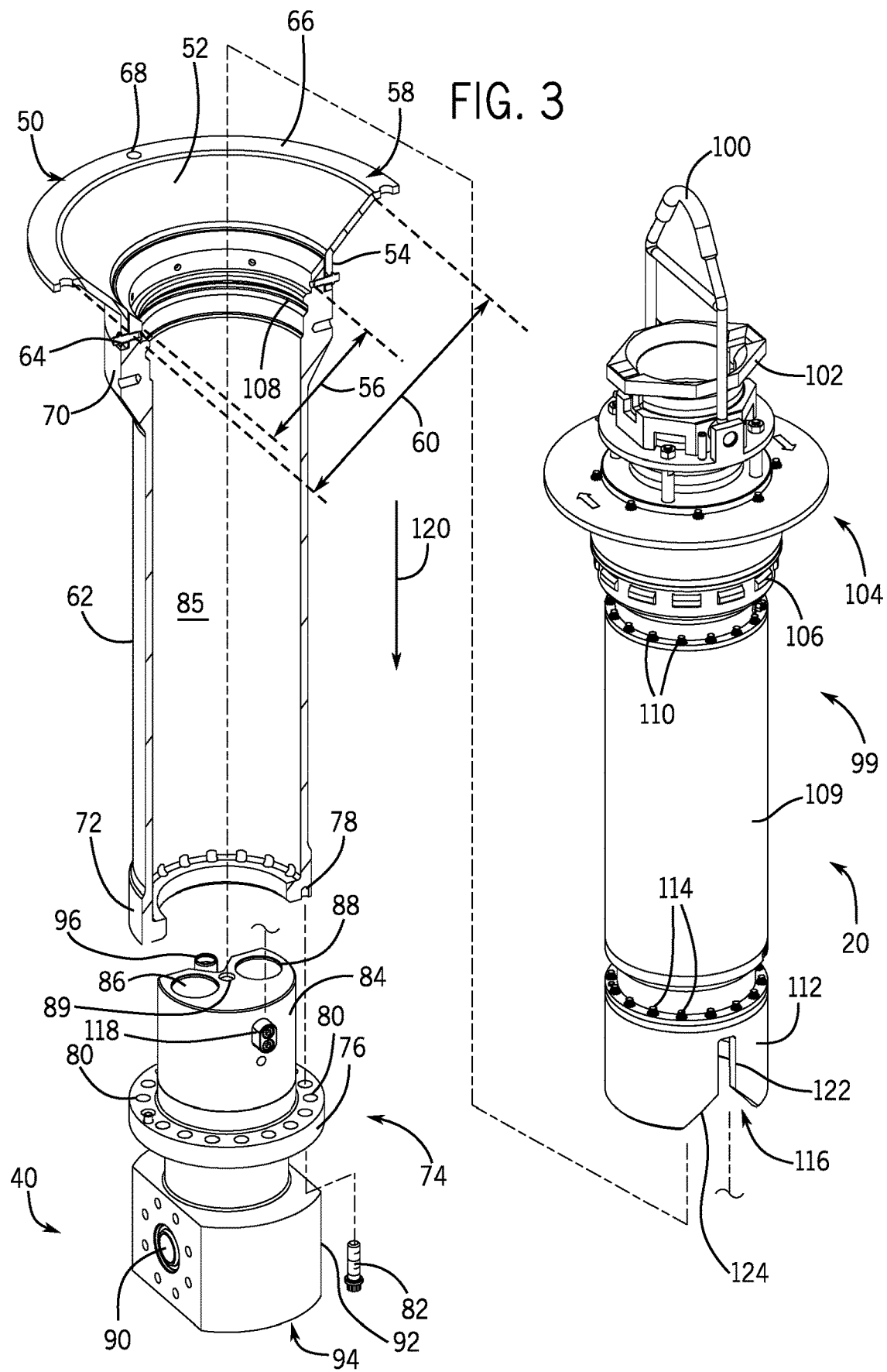
FIG. 3 is an exploded perspective view of an embodiment of a receptacle and a fluid injection system.

FIG. 3 is an exploded perspective view of an embodiment of the receptacle 40 capable of receiving the fluid injection system 20. The receptacle 40 includes a guide funnel 50 with a sloped annular surface 52 (e.g., a conical surface) that channels and aligns the fluid injection system 20 during connection to the Christmas tree 22. Specifically, the guide funnel 50 gradually changes in diameter from a first annular end 54 with a diameter 56 to a second annular end 58 with a diameter 60. The differences in diameters 56 and 60 define the angle or slope of the sloped surface 52. As illustrated, the guide funnel 50 couples to a receptacle housing 62 (e.g., an annular receptacle housing) with bolts 64. When coupled, the sloped surface 52, of the guide funnel 50, aligns and channels the fluid injection system 20 axially into the receptacle housing 62. In some embodiments, the guide funnel 50 may couple to the Christmas tree 22. For example, the second end 58 of the guide funnel 50 may include an annular flange 66 with apertures 68. The flange 66 may receive bolts through the apertures 68 that couple the guide funnel 50 to the Christmas tree 22.

Coupled to the guide funnel 50 is the receptacle housing 62. The receptacle housing 62 receives and secures the fluid injection system 20 between a first axial end 70 and a second axial end 72. As illustrated, the first end 70 couples to the guide funnel 50, while the second end 72 couples to a receptacle body 74. In order to couple to the receptacle body 74, the second end 72 of the receptacle housing 62 couples to an annular connection flange 76 on the receptacle body 74. More specifically, the second end 72 of the receptacle housing 62 includes an annular arrangement of apertures 78 that corresponds to an annular arrangement of apertures 80 on the connection flange 76. The apertures 78 and 80 enable bolts 82 to couple the receptacle housing 62 to the connection flange 76. When coupled, a first end 84 of the receptacle body 74 projects into cavity 85 of the receptacle housing 62 for connection to the fluid injection system 20. As illustrated, the first end 84 of the receptacle body 74 includes a fluid inlet 86 (e.g., chemical inlet or gas inlet), a fluid exit 88 (e.g., chemical outlet or gas outlet), and a guide pin receptacle 89. The fluid inlet 86 and the fluid exit 88 fluidly couple to corresponding flanged connections 90 and 92 on a second end 94 of the receptacle body 74. The flanged connections 90 and 92 fluidly couple the receptacle 40 to the Christmas tree 22, enabling the fluid injection system 20 to control fluid injection (e.g., chemical injection) from the extraction point 16 into the well 12. Furthermore, receptacle 40 may provide power and control signals to the fluid injection system 20 through the electrical connector 96. The electrical connector 96 in-turn receives power and control signals by coupling to the Christmas tree 22 with one or more cables through an aperture in the base of the receptacle housing 62.

In the illustrated embodiment, the fluid injection system 20 is a module 99 capable of insertion into and removal from the receptacle 40 with a remotely operated vehicle (ROV). The ability to remove and insert the fluid injection system 20 with an ROV facilitates replacement or repair without the use of a running tool and the associated costs. As illustrated, the fluid injection system 20 includes an over-pull handle 100 and a remotely operated vehicle (ROV) torque bucket 102 for coupling and removal of the fluid injection system 20. The ROV bucket 102 couples to a lockdown mechanism 104 that secures the fluid injection system 20 within the receptacle housing 62. More specifically, the lockdown mechanism 104 secures the fluid injection system 20 with radially movable dogs 106 that engage a groove 108 in the receptacle housing 62. The dogs 106 are capable of extending radially into and retracting radially away from the groove 108 enabling the fluid injection system 20 to be removed/coupled to the receptacle 40. In operation, an ROV activates or deactivates the lockdown mechanism 104 by engaging a rotating shaft within the ROV bucket 102.

Coupled to the lockdown mechanism 104 is a housing 109, such as a cylindrical or annular housing. As illustrated, the lockdown mechanism 104 couples to the housing 109 with bolts 110. The housing 109 may contain multiple components that measure and control fluid flow through the fluid injection system 20, and fluidly couple the fluid injection system 20 to the receptacle 40. To facilitate alignment and coupling, the fluid injection system 20 includes a guide skirt 112 (e.g., an annular guide skirt). The guide skirt 112 couples to the housing 109 with bolts 114. In the illustrated embodiment, the guide skirt 112 includes an axial slot 116 that aligns with and engages a guide key 118 on the receptacle body 74. More specifically, as the fluid injection system 20 moves in axial direction 120, the guide skirt 112 enables the fluid injection system 20 to rotate and align as the slot 116 engages the guide key 118, thereby circumferentially aligning the fluid and electrical connections (e.g., 86, 88, and 96). In some embodiments, the slot 116 may include an axial slot portion 122 and a converging slot portion 124. In operation, the converging slot portion 124 assists in circumferentially aligning the guide key 118 with the axial slot portion 122. Accordingly, as the housing 109 moves axially in direction 120 the slot 116 enables circumferential alignment of the housing 109 with the receptacle body 74. The circumferential alignment of the fluid injection system 20 with the receptacle 40 enables fluid and electrical coupling between the receptacle body 74 and the fluid injection system 20.

Figure 4:
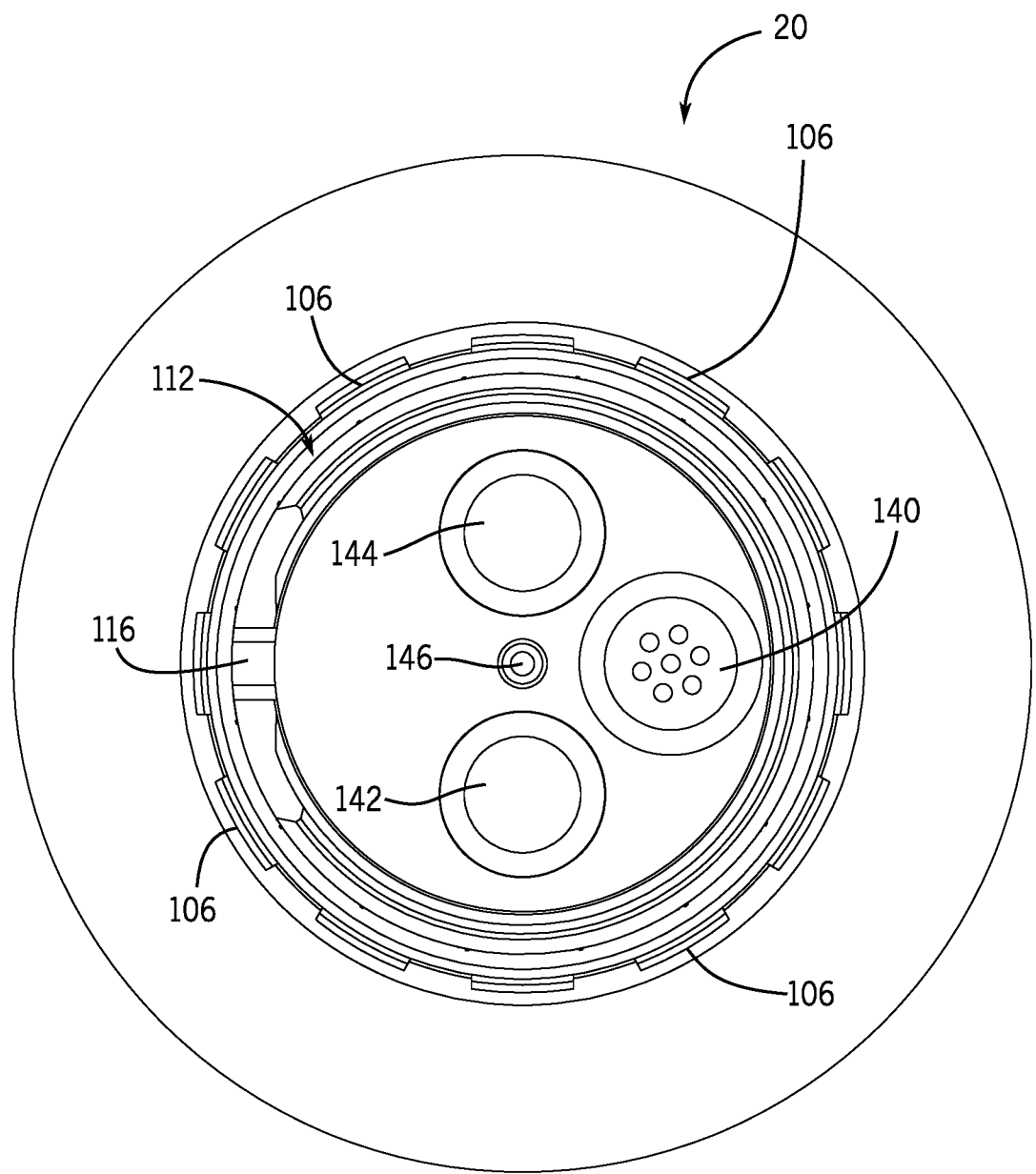
FIG. 4 is a bottom view of an embodiment of a fluid injection system.

FIG. 4 is a bottom view of the fluid injection system 20. As illustrated, the fluid injection system 20 includes an electrical connector 140, a fluid inlet coupler 142, a fluid outlet coupler 144, and an axial guide pin 146. As explained above, the engagement of the slot 116 with the guide key 118 circumferentially aligns (e.g., rotationally about the axis of) the fluid injection system 20 with the receptacle body 74. In some embodiments, the fluid injection system 20 may also include the guide pin 146 that couples to the guide pin receptacle 89 to facilitate radial or lateral alignment of electrical connector 140, fluid coupler 142, and fluid coupler 144. The radial alignment enables the electrical connector 96 to electrically couple to the electrical connector 140 removably in the axial direction, and the fluid couplers 142 and 144 to couple to the fluid inlet 86 and fluid outlet 88 removably in the axial direction. The removable connection between the electrical connector 96 and 140 enables the fluid injection system 20 to receive power, data, and electrical signals to control and power components within the fluid injection system 20 to control and measure fluid flow. In some embodiments, the fluid injection system 20 may communicate with and receive instructions from one or more external controllers (e.g., a mineral extraction system controller) located on the Christmas tree 22, on a rig at the surface, or at an extraction point 16. Furthermore, in some embodiments, the fluid injection system 20 may communicate with and receive feedback from one or more sensors distributed throughout the mineral extraction system 10, e.g., the well 12, the extraction point 16, the tree 22, or anywhere along the flow path of production fluid or injection fluid. The sensors may provide the feedback directly to the fluid injection system 20 (e.g., an internal controller), external controllers, or a combination thereof. The sensors may include pressure sensors, temperature sensors, flow rate sensors, fluid composition sensors, moisture content sensors, fluid density sensors, fluid viscosity sensors, or any combination thereof. The feedback from these sensors may help to improve control of the fluid injection system 20, thereby helping to control the fluid injection (e.g., flow rate, composition of injected fluid, pressure, temperature, etc.) into the well 12 for improved recovery of hydrocarbons, reduced costs, etc. Moreover, the removable axial connection between fluid inlet coupler 142 and the fluid inlet 86 of the receptacle body 74, and the fluid outlet coupler 144 and the fluid outlet 88 of the receptacle body 74 enables fluid (e.g., one or more chemicals) to flow between the Christmas tree 22 and the fluid injection system 20.

Figure 5:
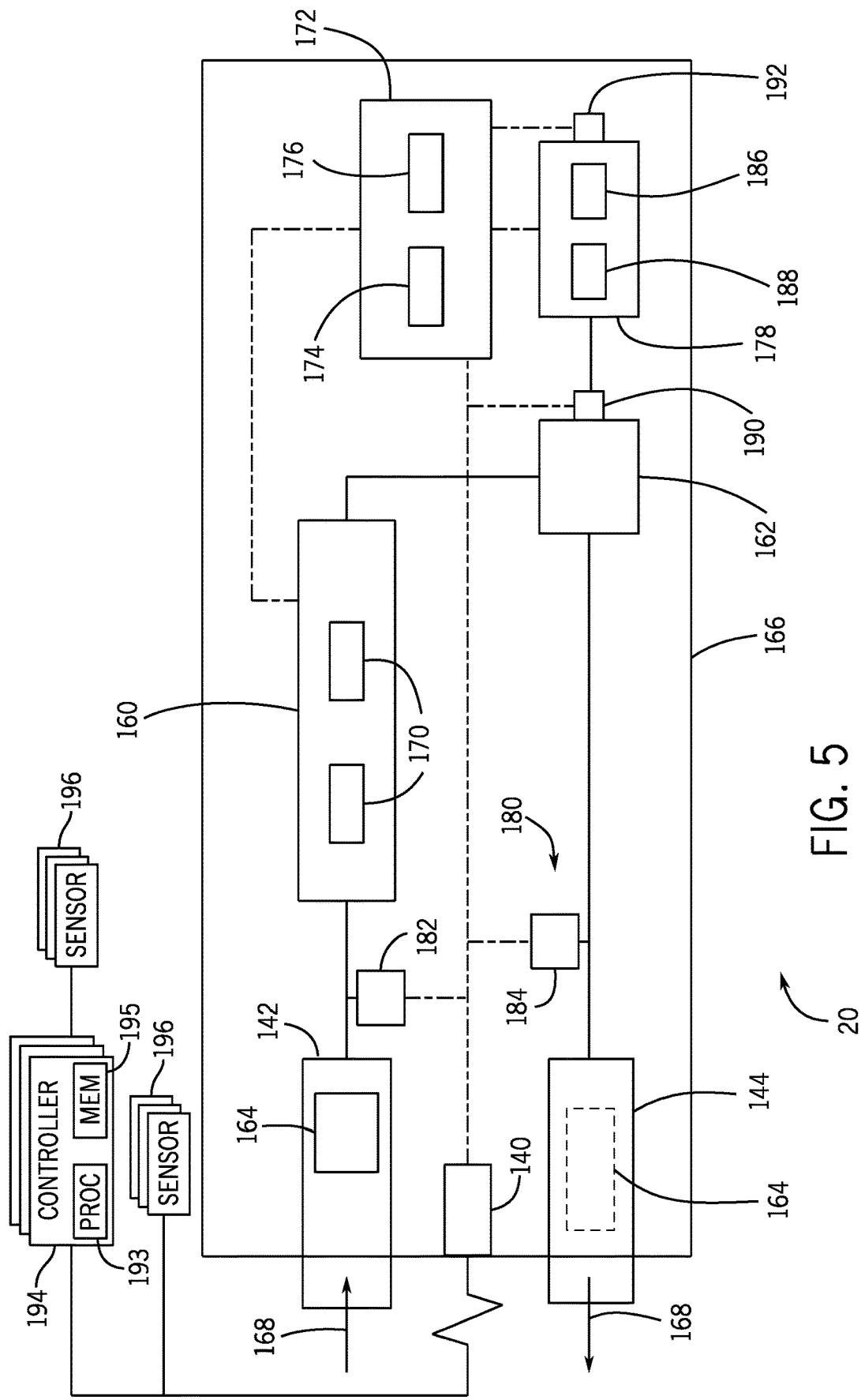
FIG. 5 is a schematic of an embodiment of a fluid injection system.

FIG. 5 is a block diagram of the fluid injection system 20 that may include a flow meter system 160, an adjustable valve 162, and a non-return valve 164 within a single removable module 166. As explained above, the fluid injection system 20 is capable of insertion and removal with an ROV, thereby reducing costs and the difficulty associated with using a running tool. In operation, the fluid injection system 20 measures and controls the flow of a fluid 168 (e.g., water, gas, chemicals) into the sub-sea resource extraction system 10. For example, the fluid 168 may include a lift gas (e.g., water vapor, air, carbon dioxide, hydrocarbon gas, etc.) configured to reduce the density of the hydrocarbons (e.g., oil or gas) in the well 12, thereby increasing flow of the hydrocarbons out of the well 12. These fluids 168 may assist in the extraction of the mineral resource or increase the operating life of the well 12. After fluidly coupling the module 166 to a Christmas tree 22 or other mineral extraction equipment, the fluid 168 enters the fluid injection system 20 through the fluid inlet coupler 142. As illustrated, the fluid inlet coupler 142 may include a non-return valve 164 (e.g., a one-way valve, a check valve, etc.) that enables fluid flow into the fluid injection system 20, but blocks the reverse flow of fluid out of the fluid injection system 20.

After passing through the fluid inlet coupler 142 (e.g., a male plug, snap fit connector, etc.), the fluid 168 enters the flow meter system 160. The flow meter system 160 may include a non-intrusive flow meter system, such as a pressure wave flow meter system or an acoustic wave flow meter system (e.g., an ultrasonic flow meter system). In the flow meter system 160 (e.g., a primary flow meter system), one or more non-intrusive transducers 170 (e.g., ultrasonic transducers) measure the fluid flow into the fluid injection system 20. The ultrasonic transducers 170 measure flow speeds by rapidly sending and receiving waves (e.g., pressure, sound, and/or ultrasonic waves) that travel through the fluid 168. A controller 172 (i.e., a fluid injection system controller) couples to the flow meter system 160 and collects the transmission and reception times by the ultrasonic transducers 170. The controller 172 then calculates how the ultrasonic waves change through the fluid 168, enabling the controller 172 to calculate changes in the fluid flow. For example, the controller 172 may include a processor 174 and memory 176, which the controller 172 uses to determine a volumetric flow rate, a mass flow rate, a volume, or a mass based on a signal from the flow meter system 160. The controller 172 may also regulate or control one or more of these parameters based on the signal from the flow meter 160 by signaling a valve actuator 178 to adjust the adjustable valve 162. To this end, the controller 172 may include software and/or circuitry configured to execute a control routine. In some embodiments, the control routine and/or data based on a signal from the flow meter 160 may be stored in memory 176 or another computer-readable medium. In some embodiments, the controller 172 (i.e., an internal fluid injection system controller) may communicate with and receive instructions from one or more external controllers 194 (e.g., a mineral extraction system controller) located on or at the Christmas tree 22, the well 12, the extraction point 16 or anywhere along the flow path of production fluid and/or injection fluid.

In some embodiments, the fluid injection system 20 may also include a sensor or transducer system 180 having one or more transducers or sensors, such as first and second sensors or transducers 182 and 184. The transducers 182 and 184 may include first and second pressure transducers, fluid composition sensors, moisture content sensors, fluid density sensors, fluid viscosity sensors, temperature sensors, or any combination thereof. In the illustrated embodiment, the transducer system 180 includes a pressure transducer system (e.g., secondary flow meter system) that enables additional, redundant, or backup measurements (e.g., flow rate measurements). The pressure transducer system 180 includes a first pressure transducer 182 and a secondary pressure transducer 184 to measure fluid pressures at different locations in the fluid injection system 20. As illustrated, the first pressure transducer 182 enables pressure measurements of the fluid 168 before the fluid passes through the adjustable valve 162, while the second pressure transducer 184 measures pressure after the fluid 168 passes through the adjustable valve 162. The controller 172 compares the pressures sensed by the pressure transducers 182 and 184 using known values about the fluid and valve position to calculate the fluid flow rate through the fluid injection system 20. Depending on the embodiment, the fluid injection system 20 may use the flow rate system 160 and the pressure transducer system 180 simultaneously or separately to measure the flow rate of fluid 168.

As explained above, the controller 172 regulates or controls fluid flow based on signals from the flow meter system 160 and/or the pressure transducer system 180. In operation, the controller 172 uses the signals to exercise feedback control over fluid flow through the adjustable valve 162 with the valve actuator 178. For example, the controller 172 may transmit a control signal to the valve actuator 178. The content of the control signal may be determined by, or based on, a comparison between a flow parameter (e.g., a volumetric flow rate, a mass flow rate, a volume, or a mass) measured by the flow meter system 160 or the pressure transducer system 180 and a desired flow parameter value. For instance, if the controller 172 determines that the flow rate through the fluid injection system 20 is less than a desired flow rate, the controller 172 may signal the valve actuator 178 to open adjustable valve 162 some distance. In response, a motor 186 may drive a gearbox 188, and the gearbox 188 may transmit rotational movement from the motor 186 into linear or rotational movement of the adjustable valve 162. As a result, in some embodiments, the flow rate through the adjustable valve 162 may increase as the adjustable valve 162 opens. Alternatively, if the controller 172 determines that the flow rate (or other flow parameter) through the fluid injection system 20 is greater than a desired flow rate (or other flow parameter), the controller 172 may signal the valve actuator 178 to close the adjustable valve 162 some distance, thereby decreasing the flow rate. In other words, the controller 172 may signal the valve actuator 178 to open or close the adjustable valve 162 some distance based on a flow parameter sensed by the flow meter 160 or the pressure transducer system 180.

The controller 172 may monitor and control the position of the adjustable valve 162 with signals received from a position sensor 190 and/or a shaft rotation sensor 192. As illustrated, the position sensor 190 couples to the adjustable valve 162 and the shaft rotation sensor 192 couples to the actuator 178. In this arrangement, the position sensor 190 provides positional feedback to the controller 172 based on actual movement of the adjustable valve 162. In contrast, the shaft rotation sensor 192 provides indirect positional feedback of the adjustable valve 162 by sensing positional change of the actuator 178. In other words, the shaft rotation sensor 192 provides signals to the controller 172 indicating movement of the actuator 178, which the controller 172 then uses to determine movement of the adjustable valve 162. The combination of the position sensor 190 and the shaft rotation sensor 192 provides the controller 172 redundant positional information or backup positional information of the adjustable valve 162, enabling the controller 172 to control fluid flow through fluid injection system 20. After passing through the adjustable valve 162, the fluid 168 exits the fluid injection system 20 through a fluid outlet coupler 144 (e.g., a male plug, snap fit connector, etc.) for use by the sub-sea resource extraction system 10. In some embodiments, the fluid outlet coupler 144 includes a non-return valve 164 (e.g., a one-way valve, a check valve, etc.) that blocks the reverse flow of the fluid 168 into the fluid injection system 20.

In the illustrated embodiment, the fluid injection system 20 may be communicatively coupled to one or more external controllers 194 (e.g., electronic controllers having processors 193 and memory 195) and one or more external sensors 196 via the electrical connector 140 and/or wireless communications circuitry. As discussed further below, each of the external controllers 194 may be configured to receive sensor feedback from the external sensors 196 and the fluid injection system 20, and each of the external controllers 194 may be configured to control the fluid injection system 20 (e.g., via internal controller 172) based on the sensor feedback. In some embodiments, one or more of the external controllers 194 may be a master controller, while the internal controller 172 may be a slave controller, or vice versa. In some embodiments, one or more of the external controllers 194 may be a redundant controller, which may assume control of the fluid injection system 20 in the event of any problems with the internal controller 172 or other internal components of the fluid injection system 20. In some embodiments, one or more external controllers 194 and the internal controller 172 may represent a distributed control system, which may collectively and cooperatively control operation of the fluid injection system 20 based on sensor feedback from the external sensors 196 and internal sensors (e.g., 160 and 180). Accordingly, one or more of the external controllers 194 may control the fluid injection system 20 (e.g., via the internal controller 172) in the manner described in detail above (e.g., to control the position of the adjustable valve 162 to adjust the flow rate of injection fluid 168) based on internal and/or external sensor feedback (e.g., 160, 180, and/or 196). Furthermore, the internal controller 172 may analyze the internal and/or external sensor feedback (e.g., 160, 180, and/or 196), and then make adjustments to the flow rate of injection fluid 168 via control of the adjustable valve 162. For example, the sensor feedback (e.g., 160, 180, and/or 196) may include sensor measurements of flow rate, pressure, temperature, fluid density, fluid viscosity, fluid composition, moisture or water content, or any combination thereof. By further example, if the sensor feedback (e.g., 160, 180, and/or 196) indicates a fluid density above an upper density threshold or below a lower density threshold, then the controller 172 and/or 194 may control the adjustable valve 162 to increase or decrease the flow rate of injection fluid 168, thereby helping to achieve a desired fluid density between the upper and lower density thresholds. Again, the fluid density may correspond to the production fluid at any location along the flow path, such as the extraction point 16, the well 12, the tree 22, or any other location. In this manner, the fluid injection system 20 may provide a suitable amount of the injection fluid 168, which improves recovery of hydrocarbons, reduces waste of the injection fluid 168, and reduces associated costs.

Figure 6:
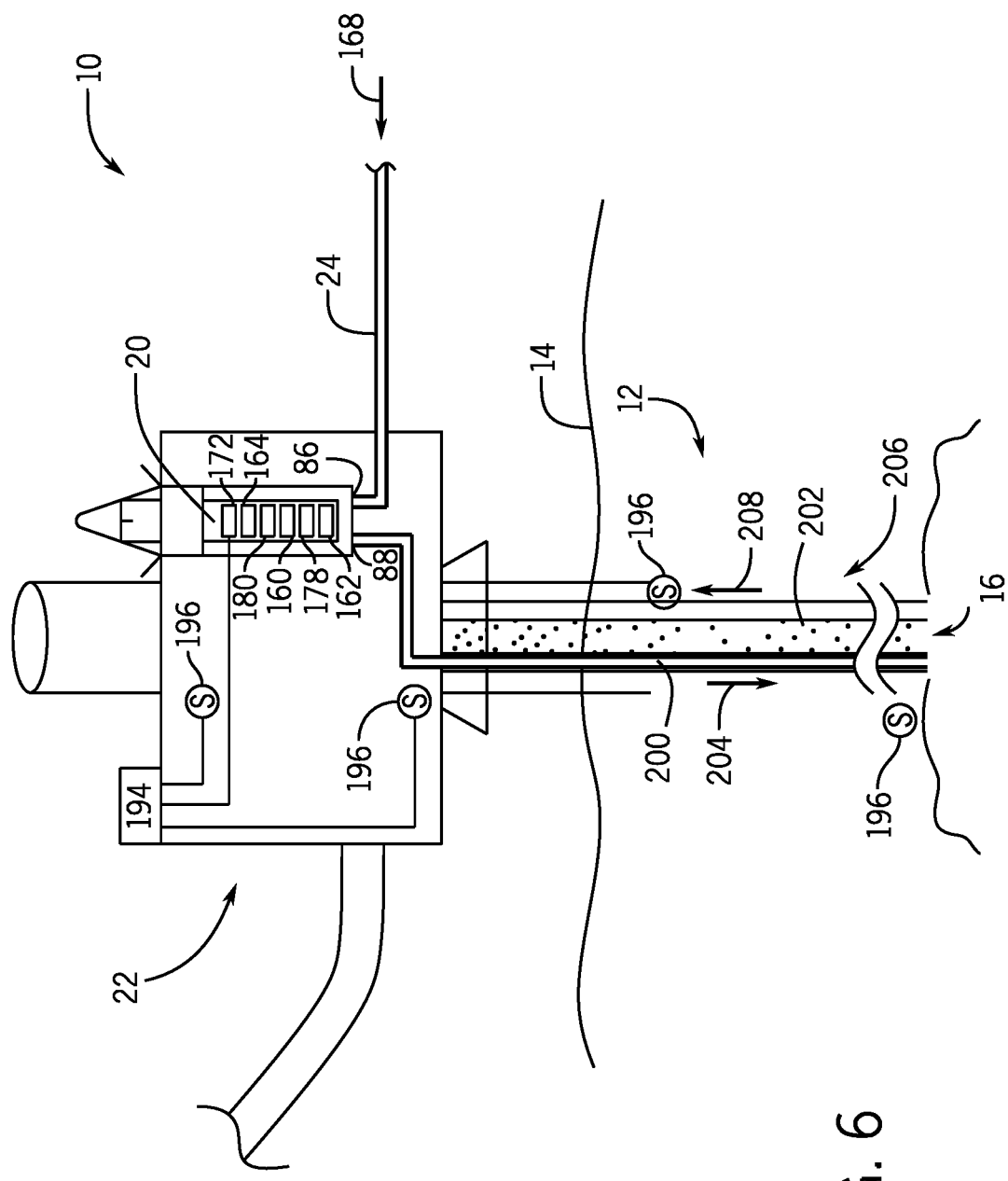
FIG. 6 is a schematic of an embodiment of the sub-sea resource extraction system of FIG. 1, wherein the fluid injection system includes a gas lift metering valve (GLMV)

FIG. 6 is a schematic of an embodiment of the sub-sea resource extraction system 10 of FIG. 1, wherein the fluid injection system 20 includes a gas lift metering valve 20 (GLMV) used for gas lift. In certain embodiments, the GLMV 20 may include any or all of the components shown in FIGS. 1-5, such as the flow meter system 160 having transducers 170, the adjustable valve 162 driven by the actuator 178, the transducer system 180 having transducers 182 and 184, the non-return valve 164, and the controller 172. As shown, the injection fluid (e.g., gas) 168 to be injected may be received by the GLMV 20 from the umbilical cord 24 via fluid inlet 86. The GLMV 20, via the valve 162, may output gas 168 through the fluid exit 88. The gas 168 may flow through a passage 200 (e.g., an annular passage) disposed about, or adjacent to, the hydrocarbon column 202, in a direction 204 toward a bottom end 206 of the hydrocarbon column 202. The addition of gas 168 to the bottom end 206 of the hydrocarbon column 202 may lighten the hydrocarbon column 202, or reduce its density, thereby enabling or increasing flow of the hydrocarbon column 202 in a direction 208 upwardly toward the floor 14, thus increasing the rate of extraction. In the illustrated embodiment, the GLMV 20 may be electrically powered and controlled (e.g., electric power to the components 160, 162, 172, 178, and 180), rather than relying on hydraulics (e.g., to actuate the valve 162). Thus, in certain embodiments, the GLMV 20 may be an all-electric GLMV 20. Furthermore, the GLMV 20 may be retrievable by an ROV or tool.

In the illustrated embodiment, the external controller 194 is coupled to the tree 22 separate from the GLMV 20, which has its own internal controller 172. The external sensors 196 are distributed throughout the system 10 in multiple locations in the tree 22, the well 12, and the extraction point 16. As discussed above, the external sensors 196 may be configured to monitor conditions and production of the well 12, such as the density, flow rate, pressure, temperature, viscosity, and other fluid characteristics of the production fluid (e.g., hydrocarbon column 202) flowing from the extraction point 16. Based on this feedback, the controller 172 and/or 194 may be configured to adjust the flow rate of injection fluid 168 (e.g., gas) through the GLMV 20 into the well 12 (e.g., via control of the adjustable valve 162), thereby adjusting the density and flow rate of production fluid (e.g., hydrocarbon column 202) out of the well 12. For example, the controller 172 and/or 194 may use the sensor feedback (e.g., from sensors 196) to control the adjustable valve 162 to provide a suitable flow of gas 168 to maintain characteristics (e.g., density and/or flow rate) of the production fluid (e.g., hydrocarbon column 202) within upper and lower thresholds.

Figure 7:
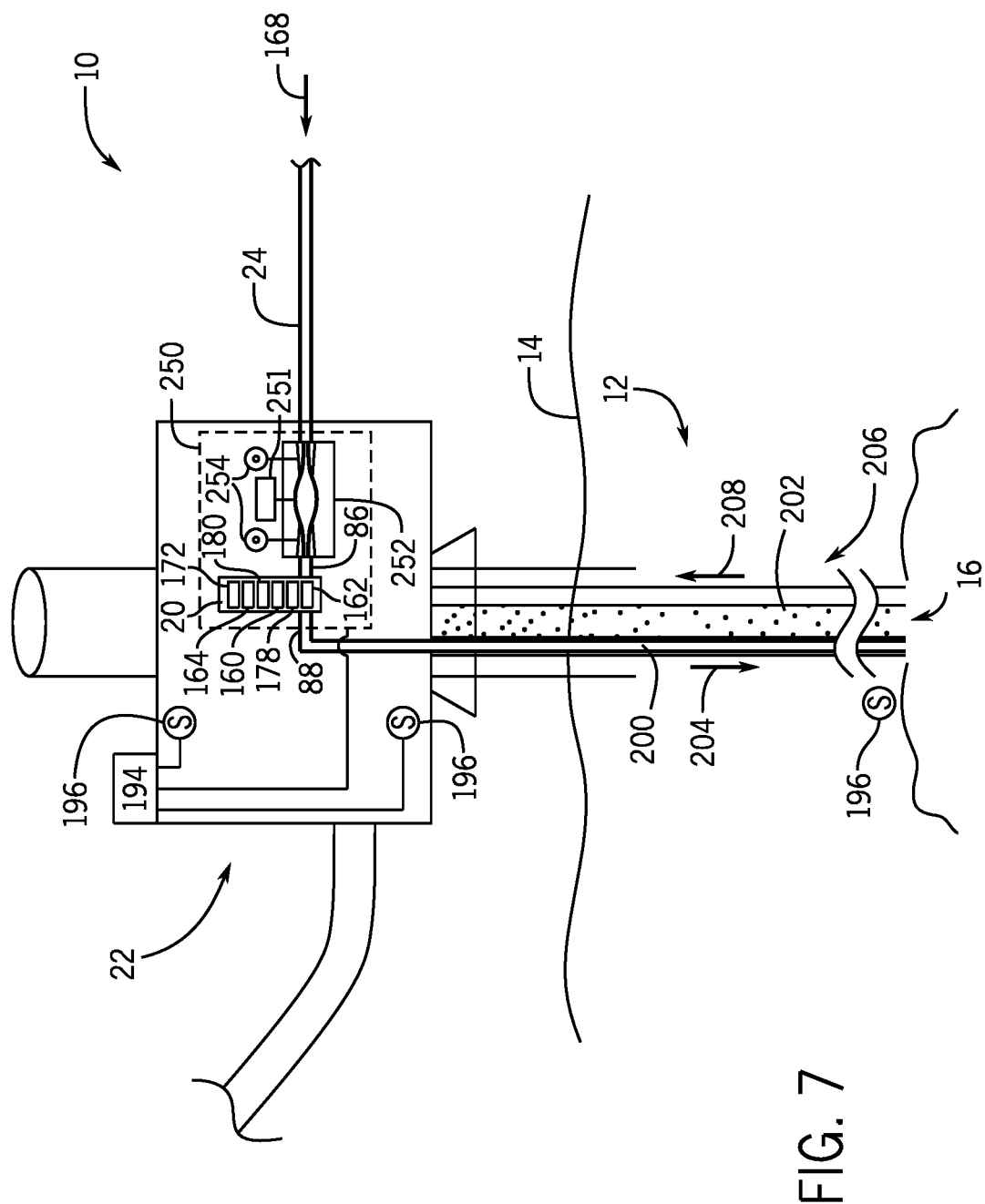
FIG. 7 is a schematic of an embodiment of the sub-sea resource extraction system of FIG. 1, having a retrievable process module (RPM) that includes the GLMV, and a separate measurement component.

FIG. 7 is a schematic of an embodiment of the sub-sea resource extraction system 10 of FIG. 1, having a retrievable process module (RPM) 250 that includes the GLMV 20 acting as an all-electric in-line gas choke, and a separate measurement component 252. As illustrated, the extraction system includes the RPM 250 that may be removable from the tree 22 via an ROV or tool. The RPM 250 may include the GLMV 20 and the measurement component 252. In certain embodiments, the GLMV 20 and the measurement component 252 may be integral components of the RPM 250, such that the RPM 250 as a whole is retrievable while the GLMV 20 and the measurement component 252 are not independently retrievable. In some embodiments, the GLMV 20 and the measurement component 252 may be independently retrievable (e.g., removable) components of the RPM 250, such that the RPM 250 as a whole is retrievable while the GLMV 20 and the measurement component 252 are also independently retrievable. The measurement component 252 may include a single-phase venturi, as shown in FIG. 7, but may also include an ultrasonic measurement device, a variable area measurement device, or other measurement device. As illustrated, the measurement component 252 includes a plurality of sensors or transducers 254 along a flow path (e.g., gas path), which may include a converging passage or portion, a restricted passage or throat portion, and a diverging passage or portion. The measurement component 252 may be included in the RPM 250, because the measurement component 252 may provide redundant, more accurate, and/or different capabilities than the GLMV 20.

As shown, a gas 168 to be injected may be received by the measurement device 252 from the umbilical cord 24. The measurement device 252 may measure volumetric flow rate, mass flow rate, temperature, pressure, viscosity, or a combination thereof. The GLMV 20 may receive the gas 168 at the fluid inlet 86 and regulate the gas flow through the GLMV 20. Specifically, the GLMV 20, via the valve 162 shown in FIG. 5, may output gas 168 through the fluid exit 88. The gas 168 may flow through the passage 200 (e.g., an annular passage) disposed about, or adjacent to, the hydrocarbon column 202, in the direction 204 toward the bottom end 206 of the hydrocarbon column 202. The addition of gas 168 to the bottom end 206 of the hydrocarbon column 202 may reduce the density of the hydrocarbon column 202, thereby enabling or increasing flow of the hydrocarbon column 202 in a direction 208 upwardly toward the floor 14, thus increasing rate of extraction. In the illustrated embodiment, the RPM 250 (e.g., including the GLMV 20 and/or the measurement component 252) may be electrically powered and controlled (e.g., electric power to the components 160, 162, 172, 178, 180, and 252), rather than relying on hydraulics (e.g., to actuate the valve 162). Thus, in certain embodiments, the RPM 250 may be an all-electric RPM 250.

In the illustrated embodiment, the RPM 250 includes an internal controller 251 (e.g., including a processor and memory) coupled to the measurement component 252 and the GLMV 20. The illustrated embodiment also includes the external controller 194 coupled to the tree 22 separate from the RPM 250, which has its own internal controller 251 and the internal controller 172 in the GLMV 20. The external sensors 196 are distributed throughout the system 10 in multiple locations in the tree 22, the well 12, and the extraction point 16. As discussed above, the external sensors 196 may be configured to monitor conditions and production of the well 12, such as the density, flow rate, pressure, temperature, viscosity, and other fluid characteristics of the production fluid (e.g., hydrocarbon column 202) flowing from the extraction point 16. Based on this feedback, the controller 172, 194, and/or 251 may be configured to adjust the flow rate of injection fluid 168 (e.g., gas) through the GLMV 20 into the well 12 (e.g., via control of the adjustable valve 162 and/or another adjustable valve in the RPM 250), thereby adjusting the density and flow rate of production fluid (e.g., hydrocarbon column 202) out of the well 12. For example, the controller 172, 194, and/or 251 may use the sensor feedback (e.g., from sensors 196) to control the adjustable valve 162 and/or another adjustable valve in the RPM 250 to provide a suitable flow of gas 168 to maintain characteristics (e.g., density and/or flow rate) of the production fluid (e.g., hydrocarbon column 202) within upper and lower thresholds.

Figure 8:
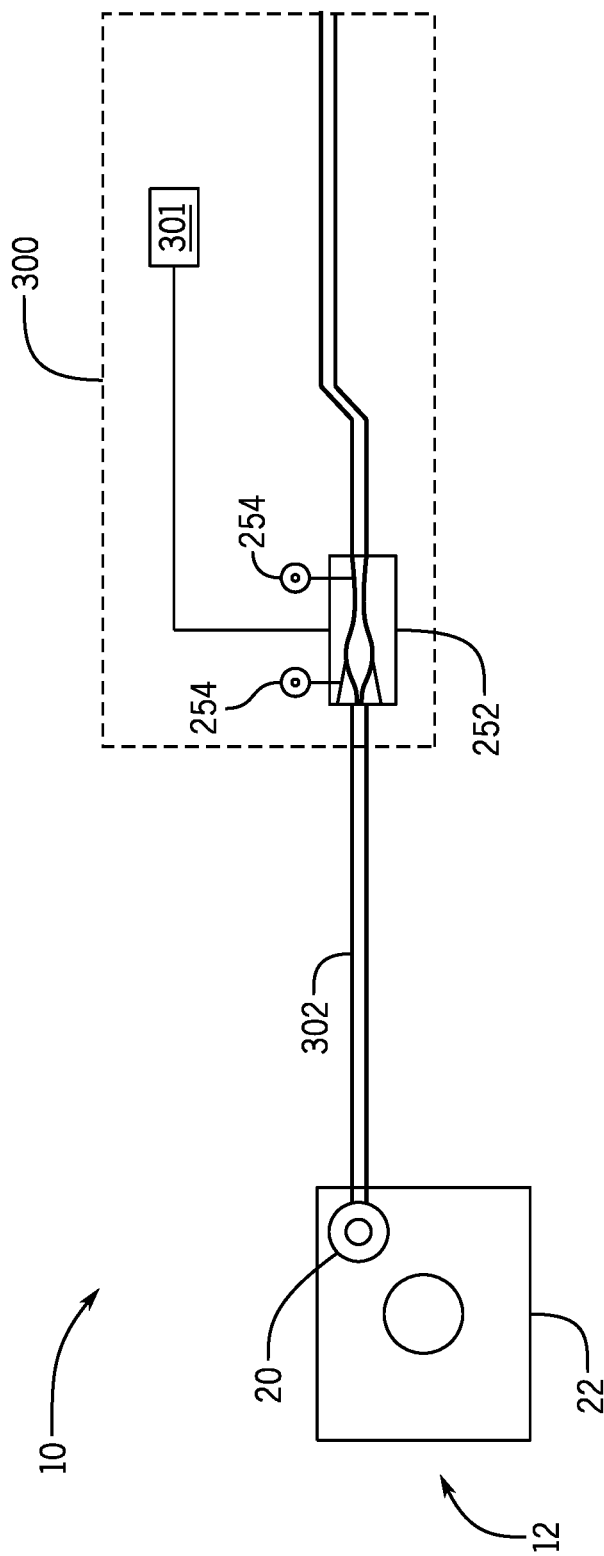
FIG. 8 is a schematic of an embodiment of the sub-sea resource extraction system of FIG. 1, having the GLMV, and the measurement component on separate structures.

FIG. 8 is a schematic of an embodiment of the sub-sea resource extraction system 10 of FIGS. 1 and 7, having a GLMV 20 acting as an all-electric in-line gas choke, and a measurement component 252 on separate structures. In the illustrated embodiment, the measurement component 252 is a single-phase venturi disposed on a manifold 300. In some embodiments, the measurement device 252 may include an ultrasonic measurement device, a variable area measurement device, or other measurement device. Additionally, the measurement device 252 may be disposed on other components upstream from the tree 22. The measurement device 252 is fluidly coupled to the GLMV 20 via a gas lift jumper 302. As previously described, the measurement component 252 may measure a characteristic of the gas flow (e.g., volumetric flow rate, mass flow rate, temperature, pressure, density, viscosity, the presence of water etc.). The GLMV 20 may then restrict gas flow into the well 12. In certain embodiments, the manifold 300 has a controller 301 coupled to the measurement device 252, wherein the controllers 194, 172, and 301 may be configured to receive feedback from sensors 196 (see FIG. 7) throughout the system 10 and control (e.g., independently or cooperatively) the gas flow via the adjustable valve 162 of the GLMV 20 as discussed in detail above.

Figure 9:
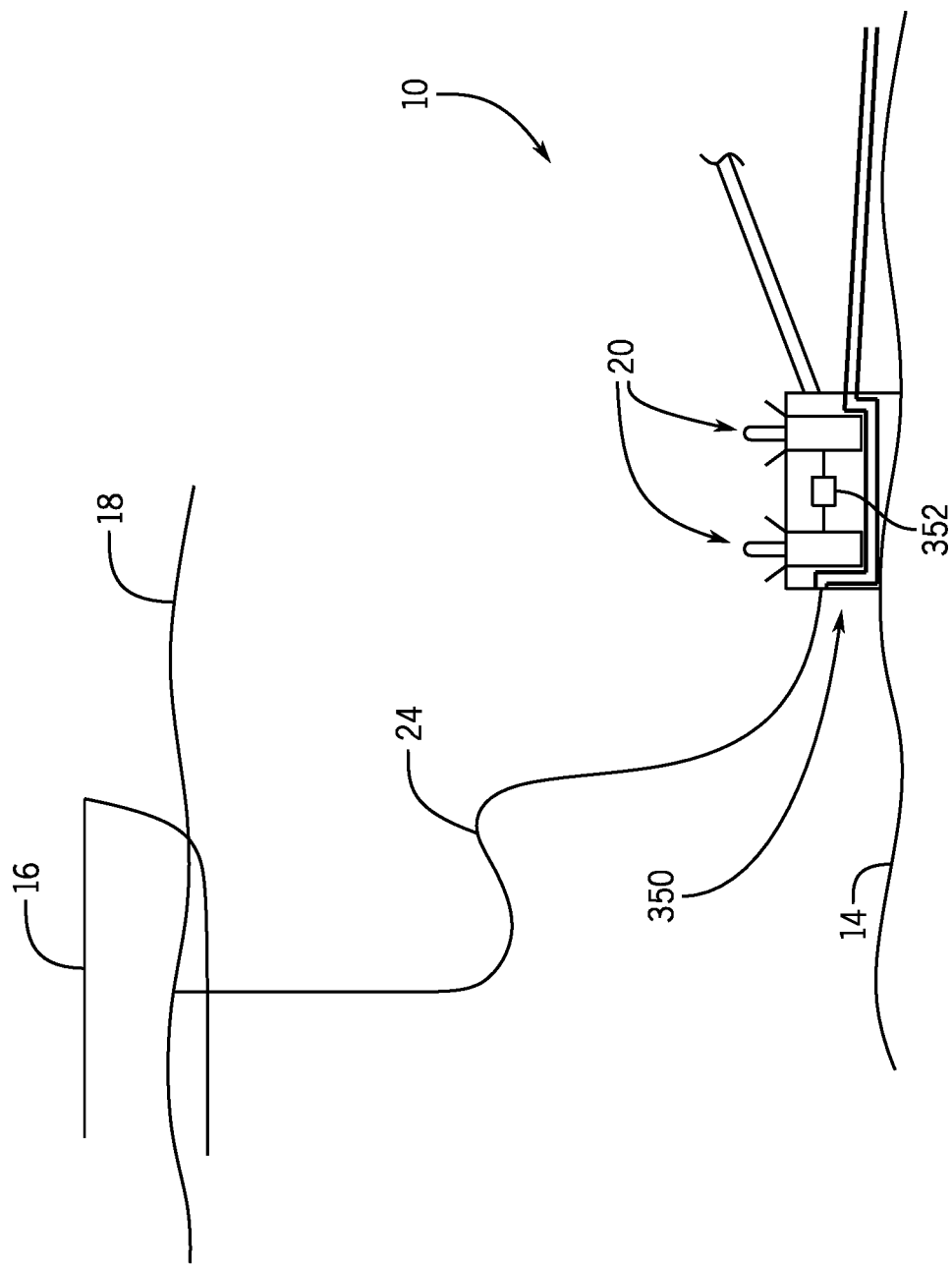
FIG. 9 is a schematic of an embodiment of the sub-sea resource extraction system of FIG. 1, having multiple GLMVs fluidly coupled by a gas lift distribution manifold to assist production of hydrocarbon up a riser from the sub-sea resource extraction system to a surface location.

FIG. 9 is a schematic of an embodiment of the sub-sea resource extraction system 10 of FIG. 1, having multiple GLMVs 20 fluidly coupled by a gas lift distribution manifold 350 to assist production of hydrocarbon up an extraction point 16 from the sub-sea resource extraction system 10 to a surface location 18 (e.g., floating production storage and offloading vessel or platform). As illustrated, gas is pumped from the extraction point 16 (e.g., rig or ship) at the surface 18 to the floor 14 via the umbilical cord 24. The gas lift distribution manifold 350 at or near the floor 14 may have multiple GLMVs 20, which may or may not be removable and retrievable. The gas lift distribution manifold 350 may distribute gas flow from the umbilical cord 24 to the various GLMVs 20, which may control the flow of gas to one or more wells 12 or inject the lift gas at the base of the production risers to assist production of the hydrocarbon up the riser through the water column to the extraction point on an floating production storage and offloading (FPSO) vessel or platform 16. In certain embodiments, the manifold 350 includes a controller 352 (e.g., including a processor and memory) coupled to the GLMVs 20, wherein the controllers 194, 172, and 352 may be configured to receive feedback from sensors 196 (see FIG. 7) throughout the system 10 and control (e.g., independently or cooperatively) the gas flows via the adjustable valves 162 of the GLMVs 20 as discussed in detail above. By replacing a lift gas choke and flow meter with a GLMV 20, lift gas injection may be simplified.

Figure 10:
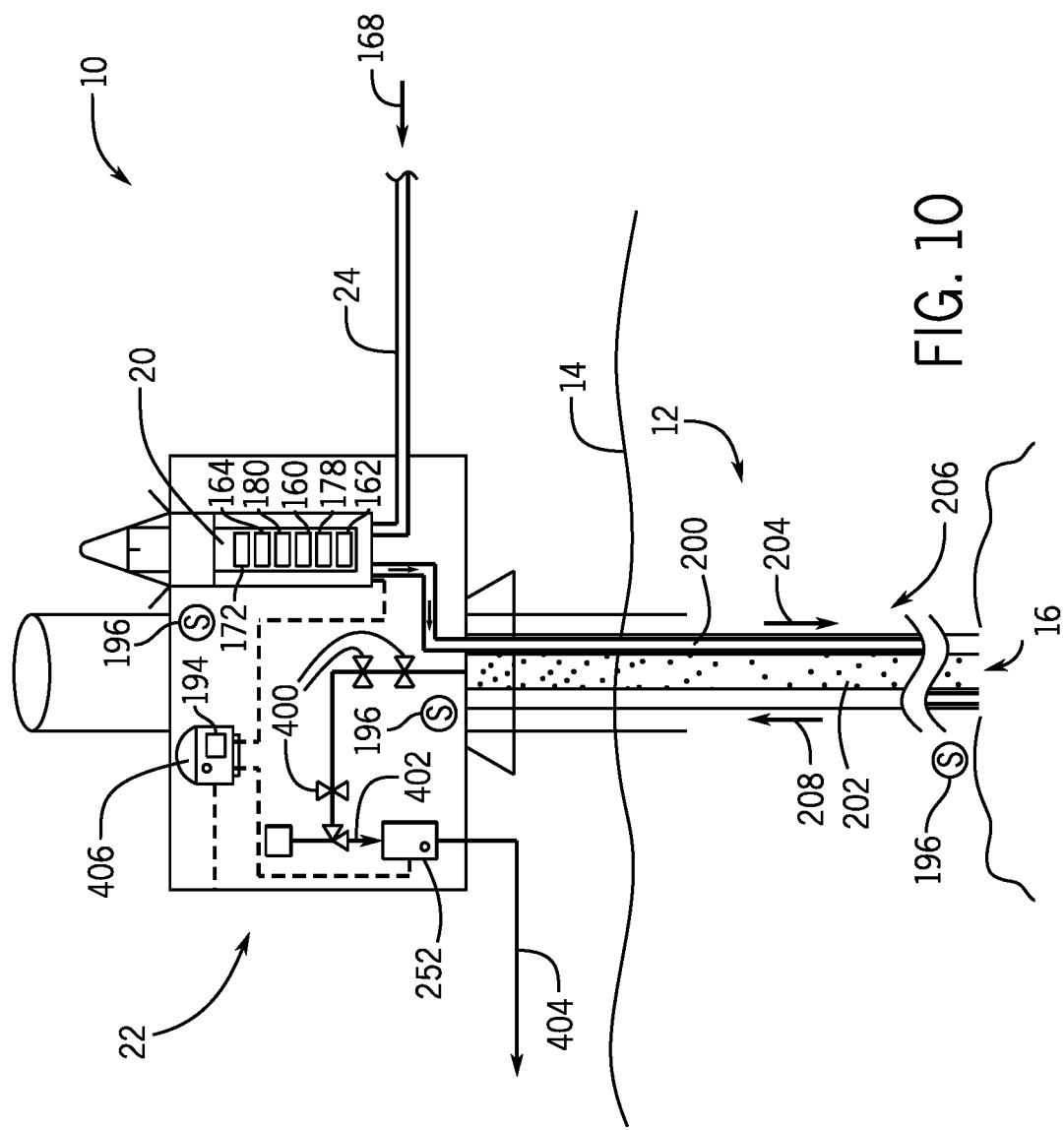
FIG. 10 is a schematic of an embodiment of the sub-sea resource extraction system of FIG. 1, wherein the GLMV is in communication with a multi-phase flow meter (MPFM)

FIG. 10 is a schematic of an embodiment of the sub-sea resource extraction system 10 of FIG. 1, wherein the GLMV 20 is in communication with a measurement device 252 (e.g., multi-phase flow meter, or MPFM). As illustrated, the production fluid (e.g., hydrocarbons or hydrocarbon column 202) flows upwardly to a series of valves 400 as indicated by arrow 208, and then passes through the MPFM 252 as indicated by arrow 402. The MPFM 252 may measure one or more characteristics (e.g., flow rate, temperature, pressure, viscosity, density, etc.) of multiple phases (e.g., gas, liquid, and solid particulate) of the production fluid, which is subsequently output through a jumper or outlet as indicated by arrow 404. The MPFM 252 can measure the flow's constituents (e.g., the water-to-gas ratio), and the flow rate and composition of those constituents. The MPFM 252 may be in electronic communication with the GLMV 20 and the external controller 194. For example, readings from the MPFM 252 may be passed to the GLMV 20 and the external controller 194. Based on the one or more measured characteristics, the GLMV 20 may restrict or enable lift gas 168 flow into the bottom end 206 of the column 202.

A subsea control module (SCM) 406, which may include the external controller 194, may be configured to receive signals from the MPFM 252 and to pass those signals to the GLMV 20, or to generate control signals and transmit those signals to the GLMV 20. The specifics of the operation of the SCM 406 will be described in more detail with regard to FIGS. 15 and 16.

The embodiment shown in FIG. 10 may be used to improve gas lift operations. Lift gas 168 may be purchased at a cost or diverted from export, thus reducing production. Based on the constituents of the production fluid 402 and the production rate of the production fluid 402, it may be determined whether there is too much or too little lift gas 168 in the production fluid 402. Based on this determination, the GLMV 20 may be controlled to increase or decrease lift gas 168 injected into the column 202. For example, too much lift gas 168 in a well that is already exceeding expected production may lead to erosion due to the higher velocities in the gas phase. Too little lift gas 168 may reduce production. For example, lift gas 168 may be injected into the column 202 at a high rate in order to get a well 12 flowing. Once a well 12 is flowing, the rate of lift gas 168 injection may be reduced or ceased until the well's 12 production drops below the expected production. Accordingly, in certain embodiments, the controller 172 and/or 194 (e.g., of SCM 406) may use the sensor feedback (e.g., from sensors 196 and MPFM 252) to control the adjustable valve 162 in the GLMV 20 to provide a suitable flow of gas 168 to maintain characteristics (e.g., density and/or flow rate) of the production fluid 402 (e.g., hydrocarbon column 202) within upper and lower thresholds.

Figure 12:
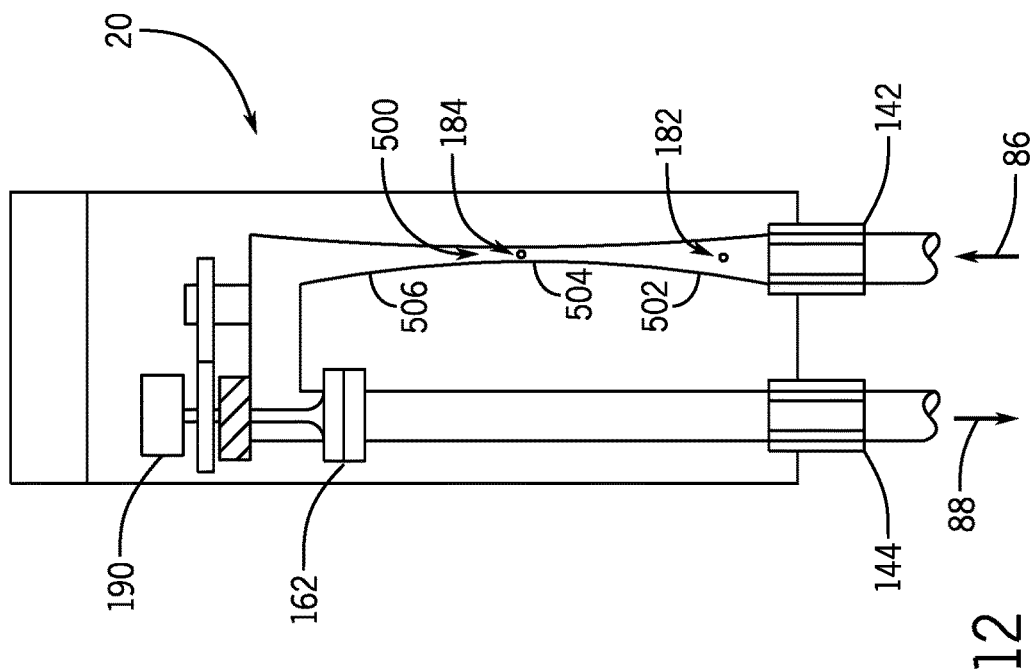
FIG. 12 is a schematic of one embodiment of the GLMV having a venturi or fixed orifice flow meter.
Figure 11:
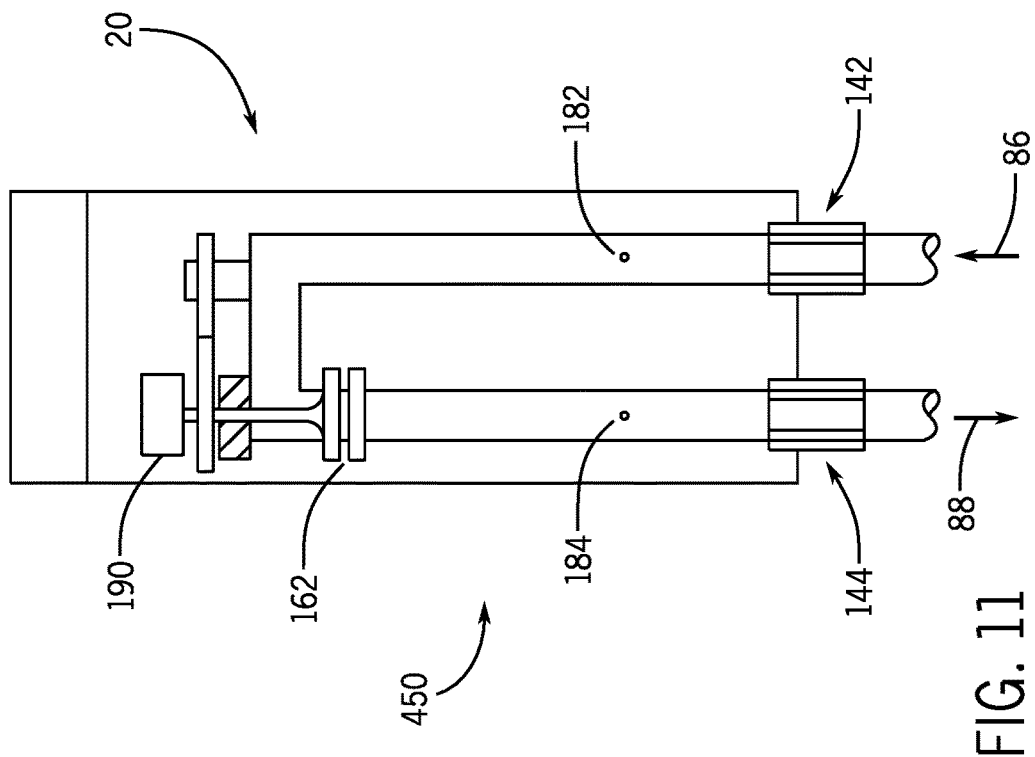
FIG. 11 is a schematic of one embodiment of the GLMV having a variable area flow meter.
Figure 13:
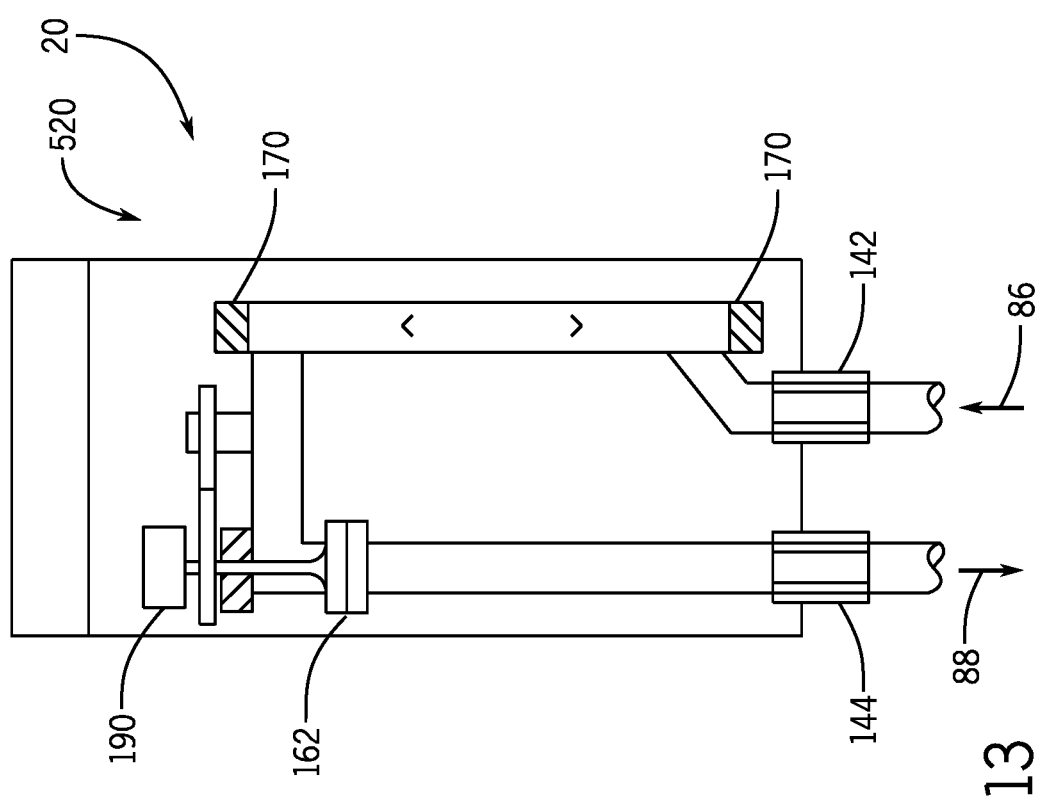
FIG. 13 is a schematic of one embodiment of the GLMV having an ultrasonic flow meter.

FIGS. 11-13 illustrate various embodiments of the GLMV 20 utilizing various fluid measurement techniques. FIG. 11 is a schematic of one embodiment of the GLMV 20 having a variable area flow meter 450. A variable area flow meter 450 measures fluid flow by allowing the cross sectional area of the flow path to vary in response to the fluid flow, causing some measurable effect that indicates the flow rate. As illustrated, the GLMV 20 includes an adjustable valve 162 (e.g., throttling valve) and a position sensor 190 for determining the position of the throttling valve 162. A first pressure sensor 182 may be disposed upstream of the throttling valve 162 and a second pressure sensor 184 may be disposed downstream of the throttling valve 162. The flow rate through the GLMV 20 may be determined based on the difference in pressure readings between the two pressure sensors 182, 184 if the flow coefficient $C_v$ and the specific gravity SG of the lift gas are known.

FIG. 12 is a schematic of one embodiment of the GLMV 20 having a venturi or fixed orifice flow meter 500. As illustrated, the venturi 500 includes a converging passage or portion 502, a restricted passage or throat portion 504 (e.g., orifice), and a diverging passage or portion 506. The GLMV 20 includes the throttling valve 162 and the position sensor 190 for determining the position of the throttling valve 162. The first pressure sensor 182 may be disposed upstream of the throat portion 504 of the venture 500 and the second pressure sensor 184 may be disposed downstream of the throat portion 504 of the venture 500. The flow rate through the GLMV 20 may be determined based on the difference in pressure readings between the two pressure sensors 182, 184 if the flow coefficient $C_v$ and the specific gravity SG of the lift gas are known.

FIG. 13 is a schematic of one embodiment of the GLMV 20 having an ultrasonic flow meter 520. As illustrated, the GLMV 20 includes the throttling valve 162 and the position sensor 190 for determining the position of the throttling valve 162. Lift gas 168 may flow through the fluid inlet 86 and into an ultrasonic metering path 530 upstream of a first ultrasonic transducer 170. The lift gas 168 may flow through the ultrasonic metering path 530 toward a second ultrasonic transducer 170. Based on reading from the ultrasonic transducers 170, 170, the flow rate of the lift gas through the GLMV 20 may be determined.

Figure 14:
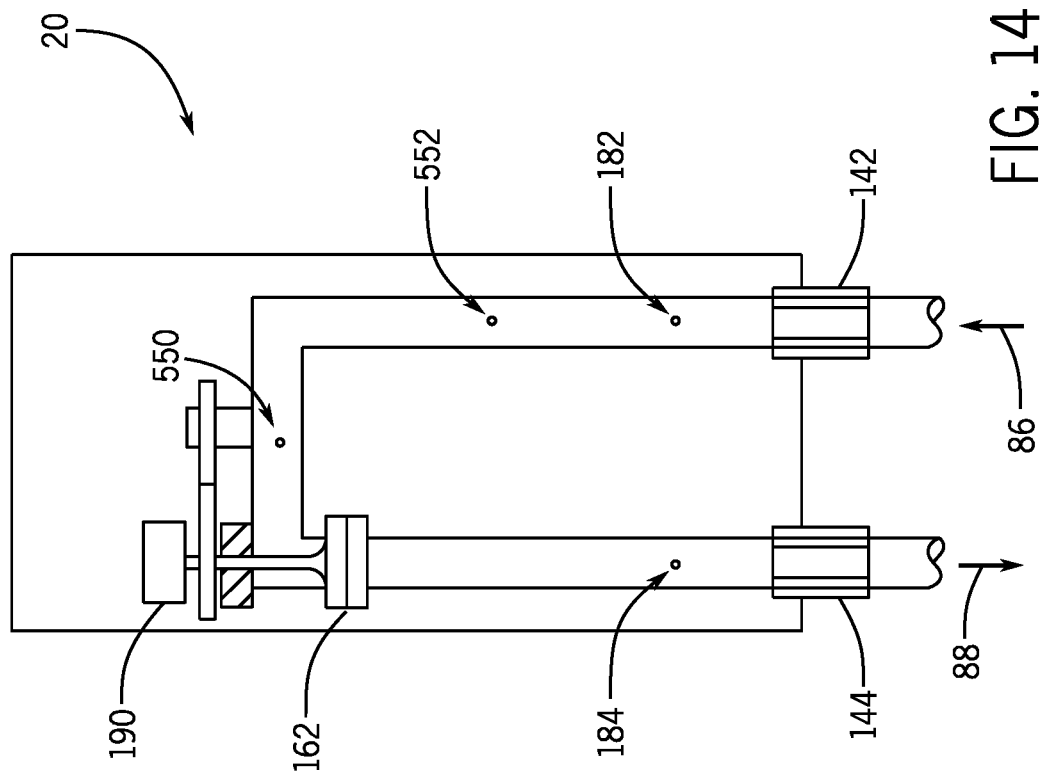
FIG. 14 is a schematic of one embodiment of the GLMV having a water sensor.

One concern in injecting gas into a well 12 that is not present when injecting liquids is the risk of hydrate formation. Specifically, if there is water in the lift gas being injected (e.g., greater than a threshold amount), a large pressure differential across the GLMV 20 may lead to low temperatures, causing a hydrate plug to form in the gas injection system. Accordingly, some embodiments of the GLMV 20 may include water detection. FIG. 14 is a schematic of one embodiment of the GLMV 20 having a water sensor 550. As illustrated, the GLMV 20 includes the throttling valve 162, and the positon sensor 190, as well as first and second pressure sensors 182, 184 on either side of the valve 162. In some embodiments, the GLMV 20 may also include a supplemental flow measurement device 552 (e.g., variable area flow measurement, fixed orifice, venturi, or ultrasonic sensors). By monitoring the presence of water in the lift gas using the water sensor 550 and the pressure across the valve 162, the GLMV may take action to minimize the risk of a hydrate plug forming (e.g., gradually opening the valve 162 to reduce the pressure differential across the valve 162). Though in the illustrated embodiment, the sensor 550 is configured to detect water in the lift gas, in other embodiments, the sensor 550 may be used to detect other substances in the lift gas.

Figure 15:
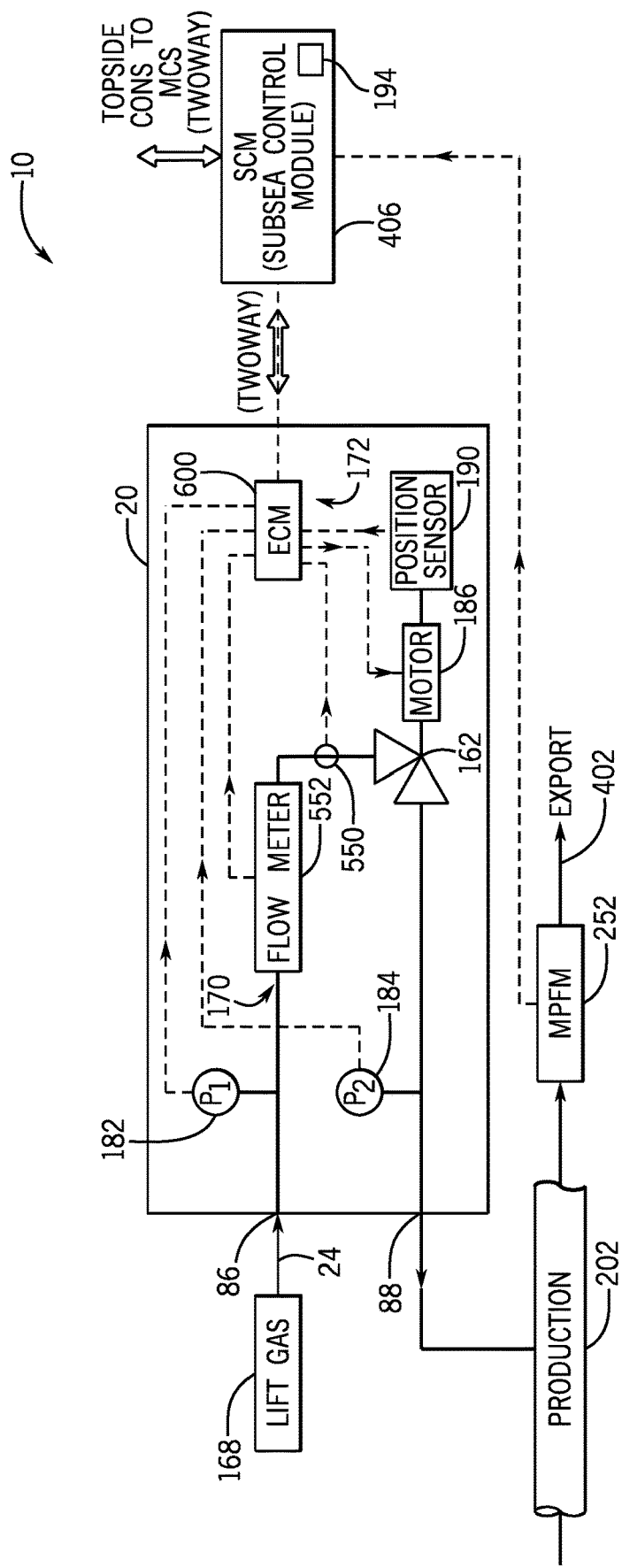
FIG. 15 is a schematic of an embodiment of the sub-sea resource extraction system of FIG. 1 utilizing the GLMV of FIG. 14 for injecting lift gas.

FIG. 15 is a schematic of an embodiment of the sub-sea resource extraction system 10 utilizing the GLMV 20 of FIG. 14. As previously discussed, lift gas 168 is received at the fluid inlet 86 of the GLMV 20. First and second pressure sensors 182, 184, the flow measurement device 170, and the water sensor 550 may measure one or more characteristics of the lift gas 168 flowing through the GLMV 20. The first and second pressure sensors 182, 184, the flow measurement device 170, the water sensor 550, the valve 162, the motor 186, and the position sensor 190 may be in communication with an ECM 600 (electronic control module) of the controller 172, which may receive input from, or control the connected components. Lift gas 168 may exit the GLMV 20 and enter the hydrocarbon column 202. Production fluid 402 may exit the hydrocarbon column 202 and flow through the MPFM 252. Readings from the MPFM 252 may be communicated to the SCM 406, which may be in communication with the ECM 600. Accordingly, the ECM may control the valve 162, among other things, based on readings from the MPFM 252.

Figure 16:
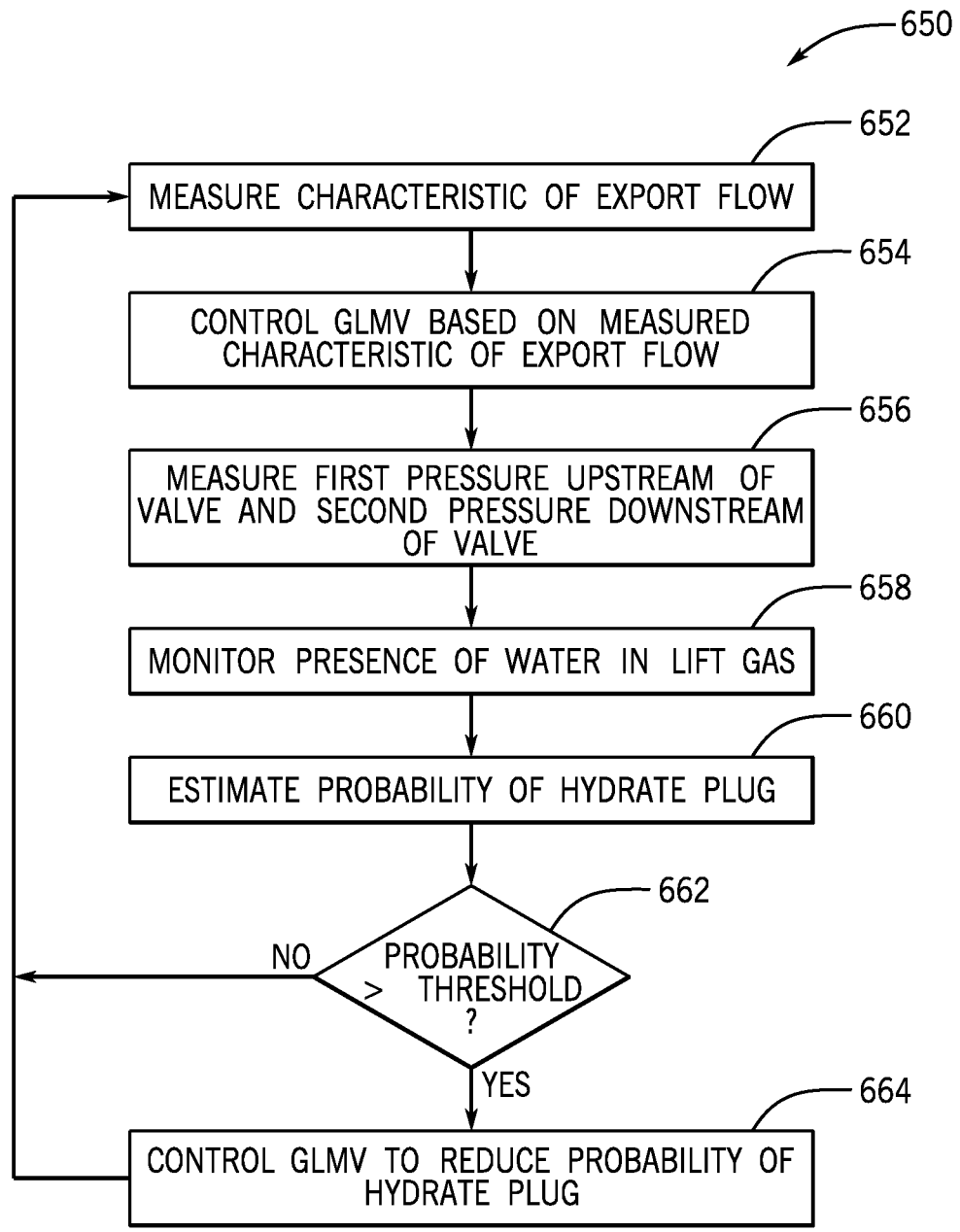
FIG. 16 is a flow chart of an embodiment of a process of using the GLMV to control lift gas injection.

FIG. 16 is a flow chart of an embodiment of a process 650 for using the GLMV 20 to control lift gas injection. In block 652, a characteristic of the production fluid 402 is measured by one or more sensors or measurement devices. The characteristic may include flow rate, temperature, pressure, density, viscosity, fluid composition, other characteristics, or a combination thereof. The sensors or measurement devices may include the one or more external sensors 196, internal sensors in the GLMV 20 (e.g., 160 and 180), the measurement device 252 (e.g., an MPFM), an ultrasonic flow meter, a venturi, a pressure sensor, a temperature sensor, a fluid composition sensor, a viscosity sensor, a fluid density sensor, or any combination thereof. The sensor feedback may be received by the controller 172, the controller 194 (e.g., SCM 406, ECM 600, etc.), the controller 251, the controller 301, the controller 352, or any combination thereof, which may independently or cooperatively control the adjustable valve 162 of the GLMV 20 to adjust the flow rate of lift gas 168. Accordingly, in block 654, the GLMV 20 may be controlled based on the sensor feedback. For example, the valve 162 may be opened or closed to increase or decrease the flow of lift gas 168 into the hydrocarbon column 202.

In block 656, a first pressure is measured by a first pressure sensor 182 upstream from the valve 162 and a second pressure is measured by a second pressure sensor 184 downstream from the valve 162. In some embodiments, the first and second pressures may be used to determine the flow rate of lift gas 168 through the GLMV 20. In block 658, the presence of water in the lift gas 168 is monitored by a water sensor (e.g., an aqua watcher). In other embodiments, the sensor 550 may detect the presence of substances different from the composition of the lift gas. In further embodiments, the sensor 550 may detect the presence of solid particulate, a liquid, another gas, or a combination thereof. Based on the presence of water in the lift gas 168 and the difference between the first and second pressures, a probability of a hydrate plug maybe estimated (block 660). In block 662, if the probability is below a threshold value, the process 650 may return to block 652. If the probability is above the threshold value, one or more controllers (e.g., 172, 194, 251, 301, 352, 406, 600, etc.) may control the valve 162 to reduce the probability of a hydrate plug (block 664). The process 650 may then return to block 652.

As discussed in detail above, the disclosed embodiments include a fluid injection system 20 (e.g., a GLMV) in communication with various external sensors (e.g., 196) separate from the fluid injection system 20, wherein a controller is configured to control the fluid injection system 20 in response to feedback from the sensors. For example, the fluid injection system 20 may inject lift gas into the bottom of a hydrocarbon column of a well based on feedback from an MPFM that measures one or more characteristics of the export flow of the well in order to increase production. In some embodiments, the GLMV may also have a sensor for detecting substances within the lift gas. For example, the GLMV may be configured to detect the presence of water vapor within the lift gas and to take measures to mitigate the risk of a hydrate plug forming when the measured conditions are conducive to a hydrate plug. Accordingly, the disclosed embodiments offer a closed loop system for managing lift gas injection. Furthermore, the features shown in FIGS. 1-16 are intended to be used in any combination with one another.

While the disclosed subject matter may be susceptible to various modifications and alternative forms, specific embodiments have been shown by way of example in the drawings and have been described in detail herein. However, it should be understood that the claimed subject matter is not intended to be limited to the particular forms disclosed. Rather, the claimed subject matter is to cover all modifications, equivalents, and alternatives falling within the spirit and scope of the disclosure as defined by the following appended claims.

The invention claimed is:

1. A system, comprising:
a fluid injection system configured to inject a fluid into a well, wherein the fluid injection system comprises a retrievable unit comprising:
a housing comprising an electrical connector, a fluid inlet, a fluid outlet, and a fluid path between the fluid inlet and the fluid outlet, wherein the retrievable unit is configured to removably couple the electrical connector, the fluid inlet, and the fluid outlet with a mating electrical connector, a first mating fluid port, and a second mating fluid port, respectively;
a valve disposed in the housing along the fluid path;
a flow meter disposed in the housing along the fluid path;
a first sensor disposed outside the housing and separate from the retrievable unit of the fluid injection system, wherein a first controller of the system is configured to adjust at least one parameter of the fluid injection system in response to feedback from the first sensor; and
a retrievable process module having the retrievable unit and a separate measurement component, wherein the retrievable unit and the separate measurement component are independently retrievable, and the separate measurement component is in fluid communication with the fluid path of the retrievable unit.

2. The system of claim 1, wherein the first controller is separate from the fluid injection system.

3. The system of claim 1, wherein the first controller is disposed in the housing of the fluid injection system.

4. The system of claim 1, comprising a second controller configured to communicate with the first controller, wherein one of the first or second controller is separate from the fluid injection system, and another one of the first or second controller is disposed in the housing of the fluid injection system.

5. The system of claim 1, wherein the fluid injection system comprises a gas injection system, the fluid inlet comprises a gas inlet, the fluid outlet comprises a gas outlet, and the fluid path comprises a gas path.

6. The system of claim 5, wherein the first controller is configured to control the gas injection system to adjust a density of a production fluid in response to the feedback from the first sensor.

7. The system of claim 5, wherein the first sensor comprises a multi-phase flow meter.

8. The system of claim 5, wherein the first sensor comprises a temperature sensor, a pressure sensor, a flow meter, a fluid composition sensor, a density sensor, or any combination thereof.

9. The system of claim 1, wherein the flow meter comprises an ultrasonic flow meter.

10. The system of claim 1, wherein the flow meter comprises a Venturi flow meter, a pressure differential flow meter, or a variable area flow meter.

11. The system of claim 1, wherein the retrievable unit comprises:
    a second sensor disposed in the housing along the fluid path to measure a water content in a flow of the fluid;
    a first pressure sensor disposed in the housing along the fluid path upstream of the valve;
    a second pressure sensor disposed in the housing along the fluid path downstream of the valve;
    wherein the first controller of the system is configured to determine a likelihood of a hydrate plug along the fluid path in the housing based at least in part on signals received from the second sensor, the first pressure sensor, and the second pressure sensor, wherein the first controller is configured to adjust the at least one parameter of the fluid injection system in response to feedback from the first sensor and the likelihood of the hydrate plug.

12. The system of claim 11, wherein the first controller is configured to open the valve to reduce a pressure differential across the valve to reduce the likelihood of the hydrate plug.

13. A system comprising:
    a gas injection system configured to inject a gas into a well to enhance flow of a production fluid from the well, wherein the gas injection system comprises a retrievable unit comprising:
        a housing comprising an electrical connector, a gas inlet, a gas outlet, and a gas path between the gas inlet and the gas outlet, wherein the retrievable unit is configured to removably couple the electrical connector, the gas inlet, and the gas outlet with a mating electrical connector, a first mating gas port, and a second mating gas port, respectively;
        a valve disposed in the housing along the gas path;
        a flow meter disposed in the housing along the gas path;
        a first sensor disposed in the housing along the gas path to measure a water content in a flow of the gas;
        a first pressure sensor disposed in the housing along the gas path upstream of the valve;
        a second pressure sensor disposed in the housing along the gas path downstream of the valve;
    a first controller configured to:
        receive signals from the first sensor, the first pressure sensor, and the second pressure sensor;
        determine a likelihood of a hydrate plug along the gas path in the housing based at least in part on the signals received from the first sensor, the first pressure sensor, and the second pressure sensor; and
        adjust at least one parameter of the gas injection system in response to the likelihood of the hydrate plug along the gas path in the housing; and
    a retrievable process module having the retrievable unit and a separate measurement component, wherein the retrievable unit and the separate measurement component are independently retrievable, and the separate measurement component is in fluid communication with the gas path of the retrievable unit.

14. The system of claim 13, comprising a gas lift distribution manifold having a plurality of the retrievable units of the gas injection system.

15. The system of claim 14, wherein the gas injection system is configured to determine a water-to-gas ratio in the flow of the gas based at least on the water content measured by the first sensor.

16. The system of claim 13, wherein the first controller is configured to adjust the at least one parameter comprising adjusting the valve in response to the likelihood of the hydrate plug along the gas path in the housing.

17. The system of claim 16, wherein the first controller is configured to open the valve to reduce a pressure differential across the valve to reduce the likelihood of the hydrate plug.

18. The system of claim 13, comprising a second sensor configured to measure a parameter of the flow of the production fluid, wherein the first controller is configured to adjust at least one parameter of the gas injection system in response to feedback from the second sensor.

19. The system of claim 18, wherein the parameter of the flow of the production fluid comprises a density of the production fluid, a flow rate of the production fluid, or a combination thereof.

20. The system of claim 13, comprising a second sensor disposed outside the housing and separate from the retrievable unit of the fluid injection system, wherein the first controller is configured to adjust at least one parameter of the gas injection system in response to feedback from the second sensor.

21. The system of claim 13, wherein the first controller is separate from the retrievable unit of the gas injection system.

22. The system of claim 13, wherein the first controller is disposed in the housing of the retrievable unit of the gas injection system.

23. The system of claim 13, comprising a second controller configured to communicate with the first controller, wherein one of the first or second controller is separate from the retrievable unit of the gas injection system, and another one of the first or second controller is disposed in the housing of the retrievable unit of the gas injection system.

24. A method comprising:
    monitoring a sensor configured to measure one or more characteristics of a production fluid; and
    controlling a gas injection system based on signals received from the sensor, wherein the gas injection system is configured to inject a gas into a well to enhance flow of the production fluid from the well, and the gas injection system comprises a retrievable unit comprising:

a housing comprising an electrical connector, a gas inlet, a gas outlet, and a gas path between the gas inlet and the gas outlet, wherein the retrievable unit is configured to removably couple the electrical connector, the gas inlet, and the gas outlet with a mating electrical connector, a first mating gas port, and a second mating gas port, respectively;

a valve disposed in the housing along the gas path; and a flow meter disposed in the housing along the gas path;

wherein the sensor is disposed outside the housing and separate from the retrievable unit of the gas injection system;

wherein a retrievable process module comprises the retrievable unit and a separate measurement component, wherein the retrievable unit and the separate measurement component are independently retrievable, and the separate measurement component is in fluid communication with the gas path of the retrievable unit.

25. The method of claim 24, comprising:

measuring a first pressure along the gas path upstream of the valve in the housing of the retrievable unit;

measuring a second pressure along the gas path downstream of the valve in the housing of the retrievable unit;

monitoring an amount of water along the gas path in the housing of the retrievable unit;

determining a likelihood of a hydrate plug along the gas path in the housing of the retrievable unit based on the first pressure, the second pressure, and the amount of water; and controlling the gas injection system to reduce the likelihood of the hydrate plug, wherein controlling comprises opening the valve to reduce a pressure differential across the valve to reduce the likelihood of the hydrate plug.

* * * * *